United States Patent [19]
Abe

[11] Patent Number: 5,513,038
[45] Date of Patent: Apr. 30, 1996

[54] ANTIREFLECTIVE FILM AND OPTICAL ELEMENTS HAVING THE SAME

[75] Inventor: Jun Abe, Hachioji, Japan

[73] Assignee: Nikon Corporation, Tokyo, Japan

[21] Appl. No.: 81,189

[22] Filed: Jun. 24, 1993

[30] Foreign Application Priority Data

Jul. 24, 1992 [JP] Japan ................... 4-198815

[51] Int. Cl.[6] ................................. G02B 1/10
[52] U.S. Cl. .................... 359/580; 359/581; 359/586;
204/192.26; 252/584; 427/167; 427/567;
428/694 DE; 423/331; 423/464
[58] Field of Search .................... 427/167, 567;
204/192.26, 192.23, 192.28; 423/331, 341,
464; 252/584; 428/694 DE; 359/359, 580,
581, 586

[56] References Cited

U.S. PATENT DOCUMENTS

| | | | |
|---|---|---|---|
| 2,445,238 | 7/1948 | Nicoll et al. | 359/580 |
| 2,584,894 | 2/1952 | MacIntyre | 423/331 |
| 3,087,785 | 4/1963 | Hessinger et al. | 423/331 |
| 3,695,910 | 10/1972 | Loudenback et al. | 427/567 |
| 3,984,581 | 10/1976 | Dobler et al. | 427/167 |
| 4,237,183 | 12/1980 | Fujiwara et al. | 427/567 |
| 4,599,272 | 7/1986 | Ichikawa | 359/580 |
| 5,110,637 | 5/1992 | Ando et al. | 427/167 |
| 5,181,141 | 1/1993 | Sato et al. | 359/581 |
| 5,194,990 | 3/1993 | Boulos et al. | 359/588 |
| 5,243,255 | 9/1993 | Iwasaki | 359/581 |

FOREIGN PATENT DOCUMENTS

| | | | |
|---|---|---|---|
| 0257401 | 12/1985 | Japan | 359/581 |
| 3-162943 | 7/1991 | Japan | G02B 1/10 |
| 3-173638 | 7/1991 | Japan | G03F 1/14 |
| 3-187735 | 8/1991 | Japan | G02B 5/20 |
| 406067019 | 3/1994 | Japan | 359/580 |

OTHER PUBLICATIONS

J. I. Gittleman, et al., "Composite Semiconductors: Selective Absorbers of Solar Energy," *Solar Energy Materials*,[1], Dec 1979, pp. 93–104.

A. Feldman et al, "Modifying Structure and Properties of Optical Films by Coevaporation", J. Vac. Sci. Technol., Nov./Dec. 1986, pp. 2969–2974.

G. Arjavalingam et al, "Mixed–Metal–Oxide Planar Optical Waveguides", J. Vac. Sci. Technol., May/Jun. 1989, pp. 1294–1297.

Michael A. Russak et al, "Reactive Magnetron Sputtered Zirconium Oxide and Zirconium Silicon Oxide Thin Films", J. Vac. Sci. Technol., May/Jun. 1989.

Chee–Kin Kwok et al, "The Transition From αZr to αZro$_2$ Growth in Sputter–Deposited Films as a Function of Gas O$_2$ Content, Rare–Gas Type, and Cathode Voltage", J. Vac. Sci. Technol., May/Jun. 1989, pp. 1235–1239.

Ohtani et al, "Optical Coatings for High Power Laser Produced by Mixed Films Method", *Oyo Buturi*, vol. 59, No. 7, Jul. 1990, pp. 953–958.

Thielsch et al, "Struktur und Eigenschaften dielektrischer Mischschichten für optische Anwendungen", *Wissenschaftliche Zeitschrift der Technischen Universitat Dresden*, vol. 39, No. 1, 1990, pp. 151–156.

Patent Abstracts of Japan, vol. 15, No. 414 (M–1171), 22 Oct. 1991 (JP–A–03 173 638).

Patent Abstracts of Japan, vol. 15, No. 396 (M–1166), 8 Oct. 1991 (JP–A–03 162 943).

*Primary Examiner*—Paul M. Dzierzynski
*Assistant Examiner*—John Juba, Jr.

[57] ABSTRACT

An antireflective film, comprising a film composed of an inorganic chemical compound consisting of Mg, Si, O and F and a film composed of an inorganic chemical compound consisting of Zr, Si and O. The film shows antireflective property over a wide spectral range even with a limited number of layers. An optical element comprising a transparent body is provided with, a film formed thereon, composed of an inorganic chemical compound consisting of Zr, Si and O and a film formed as an outermost layer facing the air, composed of an inorganic chemical compound consisting of Mg, Si, O and F.

14 Claims, 9 Drawing Sheets

ANTIREFLECTIVE FILM AND OPTICAL ELEMENTS HAVING THE SAME

BACKGROUND OF THE INVENTION

1. Field of the Invention

The present invention relates to an antireflective film for an optical element adapted for use in a spectacle lens, a camera, optical communication, optical information processing, a binocular, a video still camera, a magnetooptical recording disk, a television or the like.

2. Related Background Art

In the field of antireflective film for optical elements, a $MgF_2$ film having a low refractive index and a low absorption in the visible spectral region is widely employed. The $MgF_2$ film was originally commercialized as an antireflective film formed by vacuum evaporation, for optical elements of glass, and is still used at the present. However, such $MgF_2$ film formed by vacuum evaporation cannot satisfy certain optical and mechanical requirements unless it is heated at a high temperature (200°–400° C.) during and after the evaporation. Consequently, in the preparation of a precision optical element, such $MgF_2$ film is extremely difficult to prepare, because of thermal deformation or similar reasons. For this reason, a $MgF_2$ film having sufficient performance for precision optical elements and optical elements made of plastics is not available. Also since it is extremely difficult to reduce the spectral reflectance in a single-layered antireflective $MgF_2$ film, there is ordinarily employed a multi-layered structure having three or more layers.

There has also been proposed an antireflective film principally composed of a complex oxide of Zr and Si for use on a lens, as disclosed in the Japanese Patent Laid-open Application Nos. 3-173638 and 3-162943.

Such conventional technologies require a multi-layered antireflective film, having three or more layers in order, to reduce the reflectance in the spectral reflective characteristics. Such reflective film, if prepared by sputtering or the like, has a low productivity, leading to a high production cost.

SUMMARY OF THE INVENTION

In consideration of the foregoing, the object of the present invention is to provide an excellent antireflective film having an antireflective property in a wide spectral region, with a reduced number of layers.

The present inventor already proposed, in the Japanese Patent Application No. 2-414523, a thin film composed of an inorganic chemical compound consisting of Mg, Si, O and F. This film has optical and mechanical characteristics at least equivalent to those of the $MgF_2$ film prepared by vacuum evaporation, but does not require a high temperature treatment and can easily be used on plastic lenses.

Through further investigation, the present inventors have found that an antireflective film exhibiting, even in a two-layered structure, low reflectance characteristics over a wide spectral region, comparable to those of the conventional multi-layered antireflective film having three or more layers, can be obtained by combining a film, composed of an inorganic chemical compound consisting of Zr, Si and O with the above-mentioned film of the inorganic chemical compound consisting of Mg, Si, O and F, resulting in the present invention.

Objects of, the present invention are achieved in an antireflective film with at least two layers, comprising a film composed of an inorganic chemical compound consisting of Mg, Si, O and F, and a film composed of an inorganic chemical compound consisting of Zr, Si and O, and a transparent optical element provided, at the surface side of said element, with a film composed of an inorganic chemical compound consisting of Zr, Si and O, and, at the outermost layer at the air side, with a film composed of an inorganic chemical compound consisting of Mg, Si, O and F. In order to improve the stability the Si concentration in said inorganic chemical compound consisting of Mg, Si, O and F is preferably selected within a range of 3–20 wt. %. The atomic ratios of the constituent elements are preferably selected within following ranges:

$1.3 \leq F/Mg \leq 3.2$ $0.4 \leq O/Mg \leq 1.4$ $0.1 \leq Si/Mg \leq 0.6$

Also, in the above-mentioned film composed of the inorganic chemical compound consisting of Zr, Si and O, the atomic ratios of the constituent elements are preferably selected within following ranges:

$0.5 \leq Si/Zr \leq 15$ $1.6 \leq O/Zr \leq 31.6$

With respect to the atomic ratio of ZrSiO, it was experimentally determined that the refractive index of the prepared film varied within a range of about 1.80 to 2.00 by varying the Si content within a range of 5 to 15 wt. %. FIG. 15 shows the change in the refractive index of ZrSiO film as a function of Si content. Also Michael A. Russak and Christopher V. Jahnes already reported, in Journal of Vacuum Science & Technology, A7(3), May/June 1989, that said film assumed an amorphous structure with a $SiO_2$ content of 10 at. % and that the film was superior, in thermal and mechanical properties, over pure zirconia film. For these reasons, it is anticipated that such a film can be easily controlled, in the production, to an optically stable high refractive index, particularly in a range of about 1.88 to 1.96. Furthermore, A. Feldman, E. N. Farabaugh and W. K. Haller reported, in Journal of Vacuum Science & Technology, A4(6), November/December 2969–2974, 1986, the excellent optical and mechanical properties of amorphous ZrSiO film. On the other hand, the materials frequently employed in the optical thin films show significant fluctuation in the refractive index and are extremely difficult to handle in the above-mentioned range of refractive index (1.88–1.96). Based on these facts, the present inventor decided to use said ZrSiO film as a part of the multi-layered film of the present invention, to resolve the above-mentioned drawbacks could be resolved.

These films can be prepared by reacting the constituent elements or compounds containing said elements in plasma, or more specifically by sputtering. The sputtering conditions are suitably determined according to the desired optical characteristics, but $MgF_2$ and Si can be employed as targets for sputtering for forming the film composed of an inorganic chemical compound consisting of Mg, Si, O and F (said film being hereinafter represented as MgSiOF film regardless of the atomic ratio thereof), and $ZrO_2$ and Si can be employed as targets for sputtering for forming the film composed of an inorganic chemical compound consisting of Zr, Si and O (said film being hereinafter represented as ZrSiO film regardless of the atomic ratio thereof). Preferably Ar and $O_2$ are employed as the sputtering gas, with a background pressure of about $1.1\times 10^{-3}$ Pa and a sputtering gas pressure of about $6\times 10^{-1}$ Pa.

The antireflective film of the present invention comprises, on a substrate consisting of a transparent optical element such as a glass lens or a plastic lens for use in spectacles or a camera, a ZrSiO film formed on the side of the surface of said substrate, and a MgSiOF film formed thereon as an outermost layer at the air side. At least two layers can provide an antireflective film for a wide spectral region, but the number of layers may be made larger. Also the substrate may be provided, in advance, with an organic hard coating.

The MgSiOF film employed in the present invention undergoes by a change in the molecular refraction, presumably due to a change in the Si-O-Si bonding angle or in the Si-Si atomic distance, resulting from the bonding of at least Si and F. In the aforementioned Japanese Patent Application No. 2-414523, it is described that the low refractive index of the MgSiOF film is ascribable to a change in the molecular refraction. The MgSiOF film, being preparable without heating of the substrate, is at least comparable or superior, in mechanical properties (scratch resistance, adhesion strength etc.) and in optical properties (transmittance, stability of refractive index, absorption etc.) to the conventional $MgF_2$ film prepared by vacuum evaporation with heating of the substrate to a high temperature. The applicability of the MgSiOF film to the plastic substrate, which does not withstand the high temperature treatment, is an extremely important feature.

The reduced refractive index of the MgSiOF film is presumably ascribable to a change in the molecular refraction of the inorganic chemical compound constituting said film. More specifically, the positive $Si^{4+}$ ion has a fixed ion refraction, but the ion refraction of $O^{2-}$ ion varies depending on the bonding state thereof. This signifies that $Si^{4+}$, having a small ion radius, has a strong effect of polarizing the adjacent $O^{2-}$ion. Also in the reaction between Si and F in the plasma, there will result stabilization caused by a charge displacement between $Si^{\delta+}$ and radical F atom (radical F atom being stabilized by accepting an electron, because of its strong electronegativity), thus generating a product represented by $Si^{\delta+}$-$F^{\delta-}$. As a result, the Si-Si bond is bent by a polarization caused by the F atom, with a variation in the Si-Si distance. Consequently there results a change in the Si-O-Si bonding angle, leading to a variation in the molecular refraction.

The Si-Si bonding distance can be determined from the following equation (1):

$$d_{Si\text{-}Si}=2r_0\sin(\theta/2) \qquad (1)$$

wherein: $r_0$: Si-O bonding distance (1.60 Å)

θ: Si-O-Si bonding angle said bonding angle θ can be obtained from the following equation (2):

$$\theta = 2\sin^{-1}\left[\left(\frac{\omega_s^2 M}{\alpha}-1\right)\frac{m}{2M}\right]^{1/2} \qquad (2)$$

wherein: $\omega_s$: wave number of elongation-contraction mode ($cm^{-1}$)

M: atomic mass (Si)

m: atomic mass (O)

α: central force constant (460 $Nm^{-1}$).

Based on $\omega_s$ of 1066 $cm^{-1}$ obtained from an infrared absorption spectrum as shown in FIG. 17, θ is determined as 137.6°, and this value is substituted in the equation (1) to obtain $d_{Si\text{-}Si}$=2.98.

These values indicate, in comparison with a $SiO_x$ film formed by sputtering with a Si target and a mixture of Ar and $O_2$ ($d_{Si\text{-}Si}$=3.04 Å, θ=144°), that the Si-Si distance becomes shorter and the Si-O-Si bonding angle becomes smaller.

These results are presumably based on the polarizing effect of F atoms. Also based on the infrared absorption spectrum of the above-mentioned SiO film (target: Si, sputtering gas: Ar+$O_2$), the value x of $SiO_x$ at the wave number 1068 $cm^{-1}$ is determined as 1.72. Since the refractive index of $SiO_{1.72}$ is about 1.5, the low refractive index of the MgSiOF film of the present invention is significantly related with the polarizing effect of Si-F bond on the Si-Si and Si-O-Si bonds.

As explained in the foregoing, in the present invention, the refractive index can be lowered by a variant ion in the molecular refraction (by a reduction in the bonding angle). It is therefore possible to suppress the change in the molecular volume, caused by oxygen ions in the course of sputtering, to avoid a high refractive index as in the film formed by IAD process (refractive index becoming higher if the molecular volume increases by oxygen ion taking in), and to obtain a refractive index comparable to that of the $MgF_2$ film.

In case it is necessary to maintain the refractive index at a low constant value in the use of the MgSiOF film in the antireflective film or the like, the variation of the refractive index in time can be suppressed by the adjustment of the Si concentration in the film.

According to the investigation of the present inventor, of which results will be explained in more details in the embodiments, a low Si concentration in the film reduces the proportion of $SiO_x$ and increases the proportion of Si-$F_2$ bonds, in comparison with the case of an excessively high Si concentration. More specifically, a Si concentration of 3 to 10 wt. % improves the stability in time of the refractive index. This is presumably due to a fact that a low Si concentration stimulates the Si-F bonding of a higher bonding energy.

Also the experiments of the present inventor confirmed that, even in a region of the Si concentration exceeding 10 wt. %, the refractive index of the MgSiOF film gradually increased until the Si content reached 15 wt. %, and remained almost constant within a region of Si content of 15 to 20 wt. %, as shown in FIG. 13.

Also the present inventor investigated the variation of the refractive index in time, in a MgSiOF film of a Si concentration of 5 wt. % and that of a Si concentration of 20 wt. %. The obtained results are shown in FIG. 14, in which white circles stand for the case of Si concentration of 20 wt. %, and black circles stand for the case of Si concentration of 5 wt. %. It will be understood that said variation in time is small in either case.

Based on these experimental results, it can be judged that a MgSiOF film with Si concentration in a range of 5 to 20 wt. % is adapted for use in the antireflective film.

A two-layered antireflective film of a wide spectral region can be obtained by forming the above-mentioned MgSiOF film of a low refractive index as the outermost layer at the air side, and forming a ZrSiO film at the side contacting the surface of an optical element constituting the substrate.

DETAILED DESCRIPTION OF THE PREFERRED EMBODIMENTS

Prior to the description of the embodiments of the antireflective film of the present invention, for experimental examples for investigating the performance of the MgSiOF film will be discussed.

Experimental Examples

Figure 1:
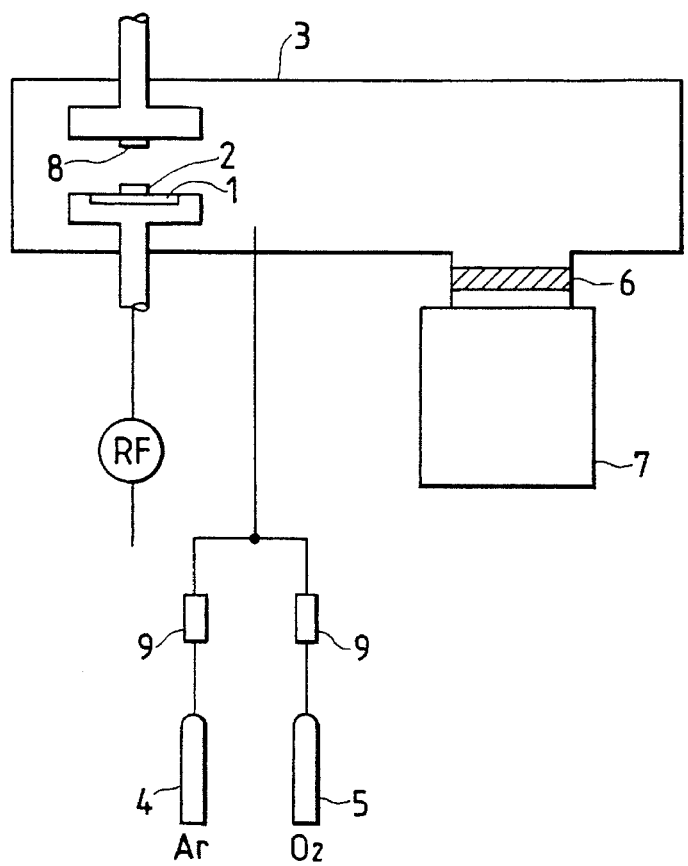
FIG. 1 is a schematic view of a sputtering apparatus employed in forming the MgSiOF film.

FIG. 1 is a schematic view of a sputtering apparatus Model SPF-530H, supplied by Nichiden Anelva Co., Ltd. and employed for forming a MgSiOF film.

In this apparatus, a Si wafer (3") 2 was placed on a $MgF_2$ target (6") 1. Argon 4 and oxygen 5 were introduced in a vacuum chamber 3 at respective flow rates of 40 sccm and 20 sccm. The evacuating rate of a cryopump 7 was regulated by a variable orifice 6 in such a manner as to obtain a pressure of $6\times10^{-1}$ Pa in the vacuum chamber. The background pressure, prior to the gas introduction, was $1.1\times10^{-3}$ Pa. A high frequency power of 500 W was applied to the $MgF_2$ target, thereby depositing a MgSiOF film on a substrate 8, which was not heated during the sputtering operation.

The MgSiOF film thus obtained displayed a refractive index n=1.40–1.41 and an absorption coefficient $\alpha = 2-3\times10^5$ $m^{-1}$ (at $\lambda=400$ nm) sufficient for use as a film on an optical element.

Figure 2:
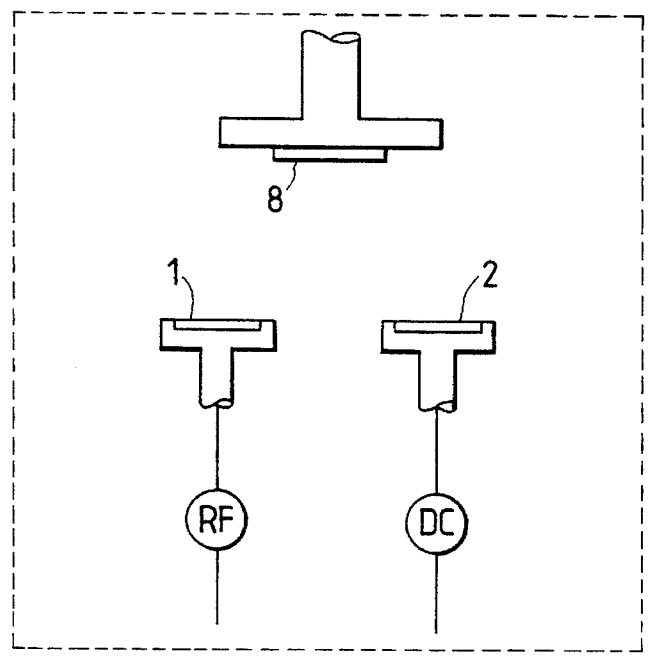
FIG. 2 is a schematic view showing a variation of the sputtering apparatus employed in forming the MgSiOF film.

FIG. 2 is a schematic view of a variation of the above-mentioned sputtering apparatus. In this embodiment, the $MgF_2$ target 1 and the Si target 2 are placed on separate holders, and an RF power source is connected to the $MgF_2$ target 1 while a DC power source is connected to the Si target 2. A MgSiOF film was prepared, under the same conditions as explained above, by applying RF and DC voltages respectively to said $MgF_2$ target 1 and Si target 2.

The MgSiOF film thus obtained were introduced in a vacuum chamber 3 displayed a refractive index of 1.40–1.41 and an absorption coefficient of $2-3\times10^5$ $m^{-1}$ (at $\lambda=400$ nm), sufficient for use as a film for an optical element.

Also films were prepared on borosilicate crown glass substrates, in a sputtering apparatus same as shown in FIG. 1, employing a mixed target of $MgF_2$ and Si (20 wt. %) and Ar and using $O_2$ as sputtering gas under varied conditions. The distance between the substrate and the target was maintained constant at 116 mm. The sputtering conditions and the optical characteristics of the obtained film are shown in Table 1.

Figure 16:
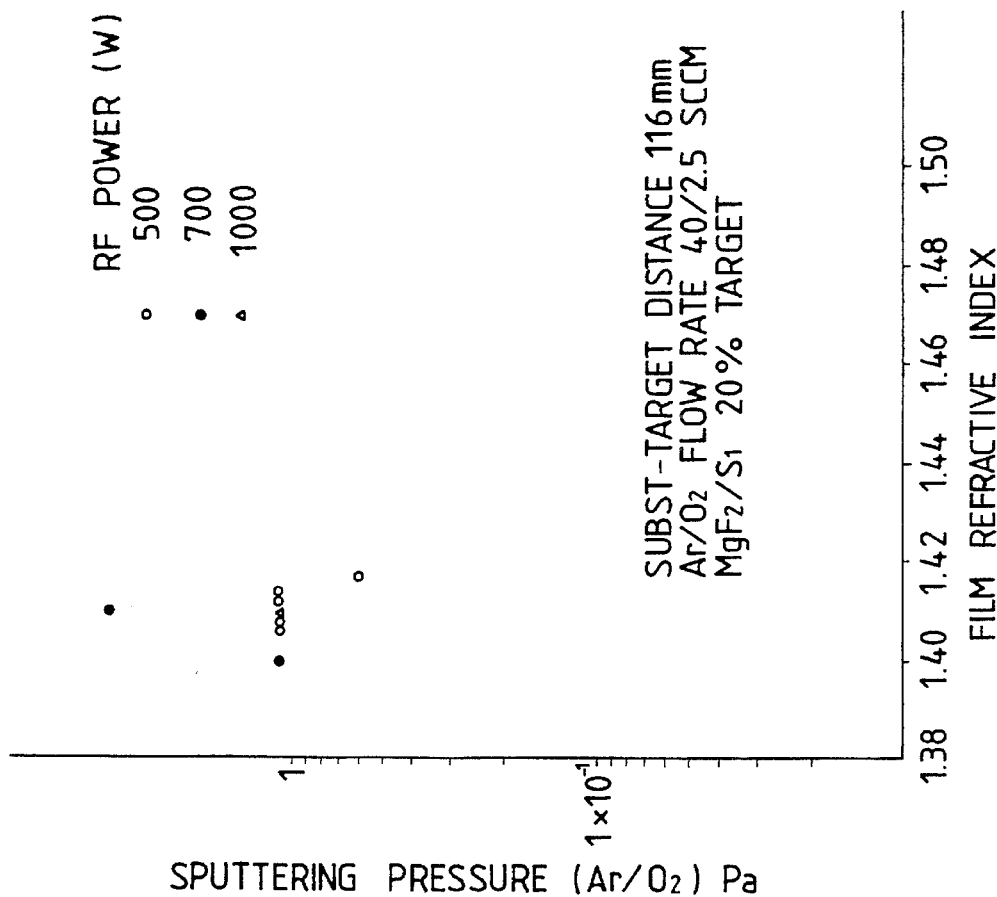
FIG. 16 is a chart showing the relationship among the refractive index of the film, the sputtering gas pressure and the RF power.
Figure 15:
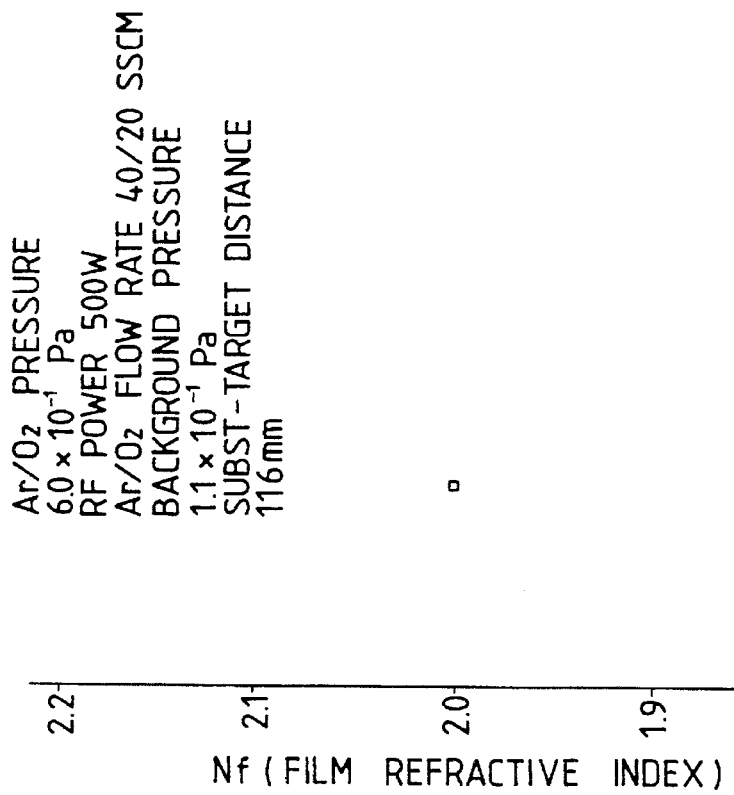
FIG. 15 is a chart showing the relationship between the Si content in the film and the refractive index thereof.
Figure 17:
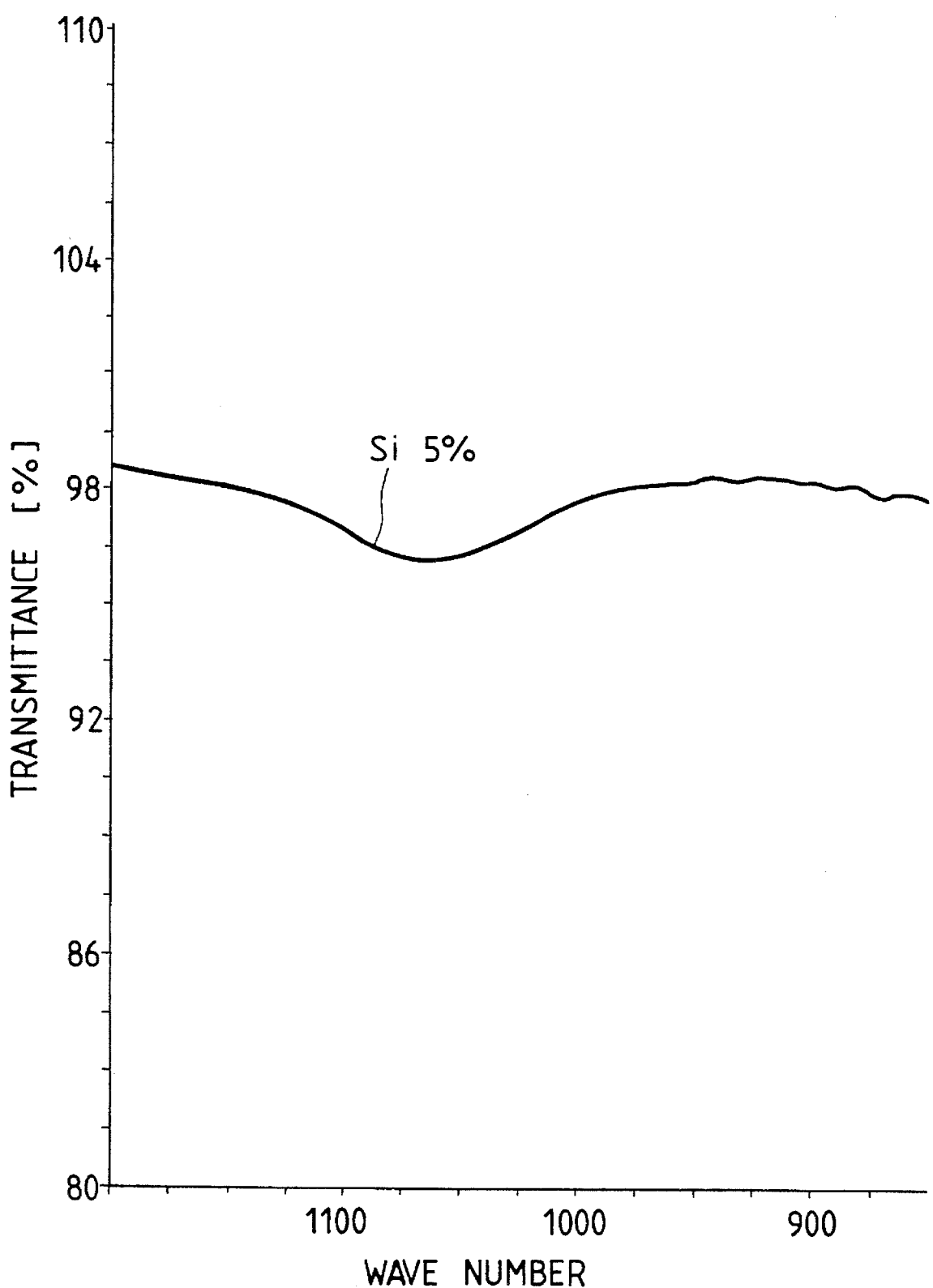
FIG. 17 is a chart showing the infrared absorption spectrum of the film.

FIG. 16 shows the relationship among the refractive index of the film, the sputtering gas pressure and the RF power, where the sputtering gas pressure was varied while the $O_2$ flow rate was maintained constant at 40 sccm in the mixture of Ar and $O_2$. Although Ar gas flow rate was also varied at the same time, this variation produced little affect in the refractive index of the film. On the other hand, when the $O_2$ gas flow rate was varied while the Ar gas flow rate was maintained constant at 40 sccm, the lowest refractive index, close to 1.40, was obtained when the flow rate ratio $O_2/Ar$ was 1/16.

TABLE 1

| Background pressure (Pa) | sputtering pressure (Pa) | Gas flow rate (sccm) Ar | $O_2$ | $N_2$ | RF power (W) | Rate (Å/sec) | Film thickness (Å) | Refractive index of film Nf | Absorption coefficient $\alpha$ $(m^{-1})$ |
|---|---|---|---|---|---|---|---|---|---|
| $1.1\times10^{-3}$ | $6.0\times10^{-1}$ | 40 | 20 | | 500 | 0.15 | 832 | 1.4119 | $1.5\times10^5$ |
| $1.1\times10^{-3}$ | $6.0\times10^{-1}$ | 40 | 20 | | 500 | 0.16 | 982 | 1.4257 | $2.2\times10^5$ |
| $1.1\times10^{-3}$ | $6.0\times10^{-1}$ | 40 | 20 | | 500 | 0.15 | 911 | 1.4265 | $1.8\times10^5$ |
| $1.1\times10^{-3}$ | $6.0\times10^{-1}$ | 40 | 2.5 | | 500 | 0.17 | 917 | 1.4169 | $2.3\times10^5$ |
| $1.1\times10^{-3}$ | 1.1 | 40 | 2.5 | | 500 | 0.14 | 1457 | 1.4072 | $2.8\times10^5$ |
| $1.1\times10^{-3}$ | 1.1 | 40 | 2.5 | | 500 | 0.12 | 778 | 1.4137 | $1.8\times10^5$ |
| $9.3\times10^{-4}$ | 1.1 | 40 | 2.5 | | 500 | 0.13 | 868 | 1.4117 | $2.0\times10^5$ |
| $1.1\times10^{-3}$ | 1.1 | 40 | 2.5 | | 500 | 0.16 | 1084 | 1.4065 | $2.4\times10^5$ |
| $1.1\times10^{-3}$ | 1.1 | 40 | 2.5 | | 500 | 0.12 | 797 | 1.4122 | $1.8\times10^5$ |
| $1.1\times10^{-3}$ | 1.1 | 40 | 2.5 | | 500 | 0.13 | 1173 | 1.4066 | $2.6\times10^5$ |

TABLE 1-continued

| Back-ground pressure (Pa) | sputtering pressure (Pa) | Gas flow rate (sccm) | | | RF power (W) | Rate (Å/sec) | Film thickness (Å) | Refractive index of film Nf | Absorption coefficient α (m⁻¹) |
|---|---|---|---|---|---|---|---|---|---|
| | | Ar | O₂ | N₂ | | | | | |
| $1.1 \times 10^{-3}$ | 1.1 | 40 | 2.5 | | 700 | 0.21 | 829 | 1.4018 | $1.8 \times 10^5$ |
| $1.1 \times 10^{-3}$ | 4.0 | 40 | 2.5 | | 700 | 0.097 | 1405 | 1.4101 | $2.3 \times 10^5$ |
| $1.1 \times 10^{-3}$ | 1.1 | 40 | 2.5 | | 1000 | 0.32 | 923 | 1.4090 | $1.5 \times 10^5$ |
| $1.1 \times 10^{-3}$ | 1.1 | 40 | 2.5 | | 700 | 0.20 | 927 | 1.4020 | $1.9 \times 10^5$ |
| $1.1 \times 10^{-3}$ | 1.1 | 40 | 2.5 | 10 | 700 | 0.15 | 695 | 1.4035 | $1.8 \times 10^5$ |

Figure 3:
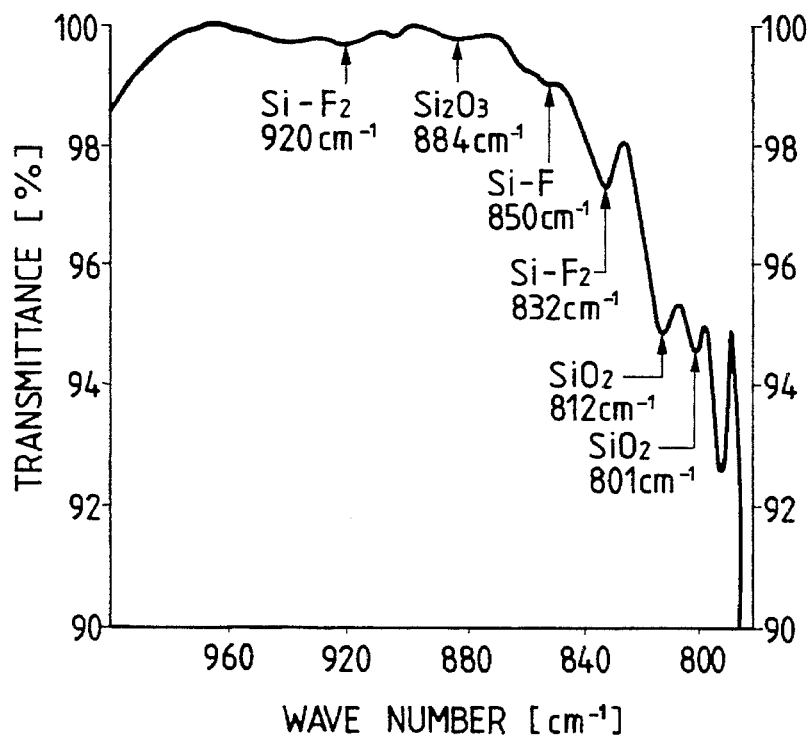
FIG. 3 is a chart showing an infrared absorption spectrum of the MgSiOF film.

Next, FIG. 3 is a chart showing the result of analysis of the infrared absorption spectrum of the MgSiOF film. As shown in FIG. 3, the MgSiOF film of the present invention was confirmed to contain a Si-F₂ bond indicated by peaks at 920 and 832 cm⁻¹, and a Si-F bond indicated by a peak at 850 cm⁻¹. The spectrum shown in FIG. 3 clearly indicates the presence of a Si-F bond with a high bonding energy in the MgSiOF film, indicating that the MgSiOF film is a compound film.

Samples of a MgF₂ film formed by evaporation with a substrate temperature of 270° C., a MgF₂ film formed by evaporation with the substrate at the room temperature, and a MgSiOF film in accordance with the present invention formed by sputtering were prepared on borosilicate crown glass substrates. The adhesion strength was tested by peeling with a cellophane adhesive tape at 4–5 kg/cm². The solvent resistance was tested by wiping the film strongly about fifteen times with lens cleaning paper impregnated with acetone. The scratch resistance was tested by rubbing the film with steel wool of #0000 under a load of 800 g, for 50 reciprocating strokes within 30 seconds. The obtained results are summarized in Table 2.

TABLE 2

| | Tape test | Solvent resistance | Scratch resistance |
|---|---|---|---|
| Borosilicate crown glass/ evaporated MgF₂ (substrate heated at 270° C.) | OK | OK | OK |
| Borosilicate crown glass/ evaporated MgF₂ (room temp.) | NO | NO | NO |
| Borosilicate crown glass/ sputtered MgSiOF | OK | OK | OK |

Figure 4:
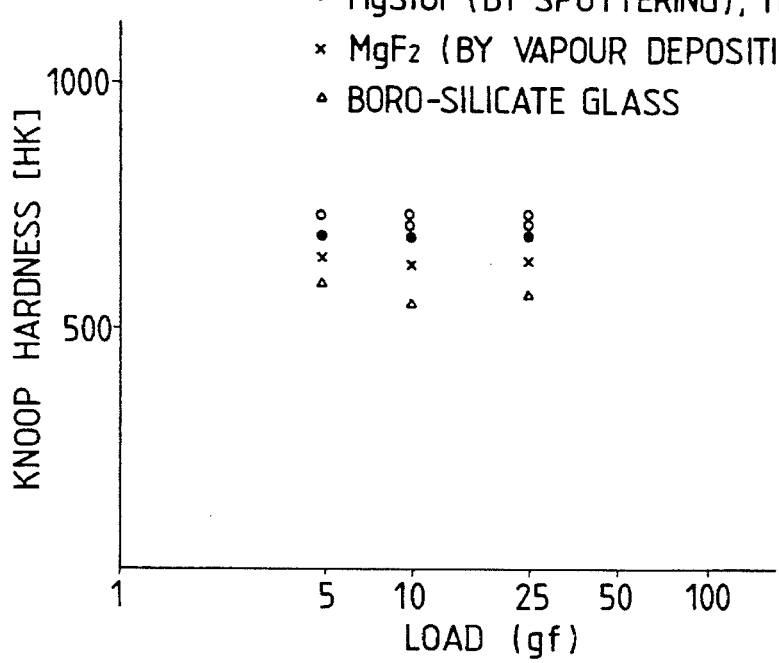
FIG. 4 is a chart showing the result of measurement of Knoop hardness of a MgSiOF film and an evaporated $MgF_2$ film.

FIG. 4 is a chart showing a comparison of Knoop hardness of the sputtered MgSiOF film (prepared at room temp.) and the evaporated MgF₂ film (prepared at 270° C.). The Knoop hardness was measured with a Micro Vickers Hardness Tester MVK-G3500AT manufactured by Akashi Mfg. Co., with loads of 10, 15 and 25 g. Both samples were prepared on borosilicate crown glass substrates. Results of measurements of a borosilicate crown glass plate only and a fused quartz plate are also shown for reference. The results shown in FIG. 4 indicate that the Knoop hardness of the MgSiOF film of the present invention is higher than that of the evaporated MgF₂ film (prepared at 270° C.) and is comparable to that of the fused quartz plate.

Figure 6:
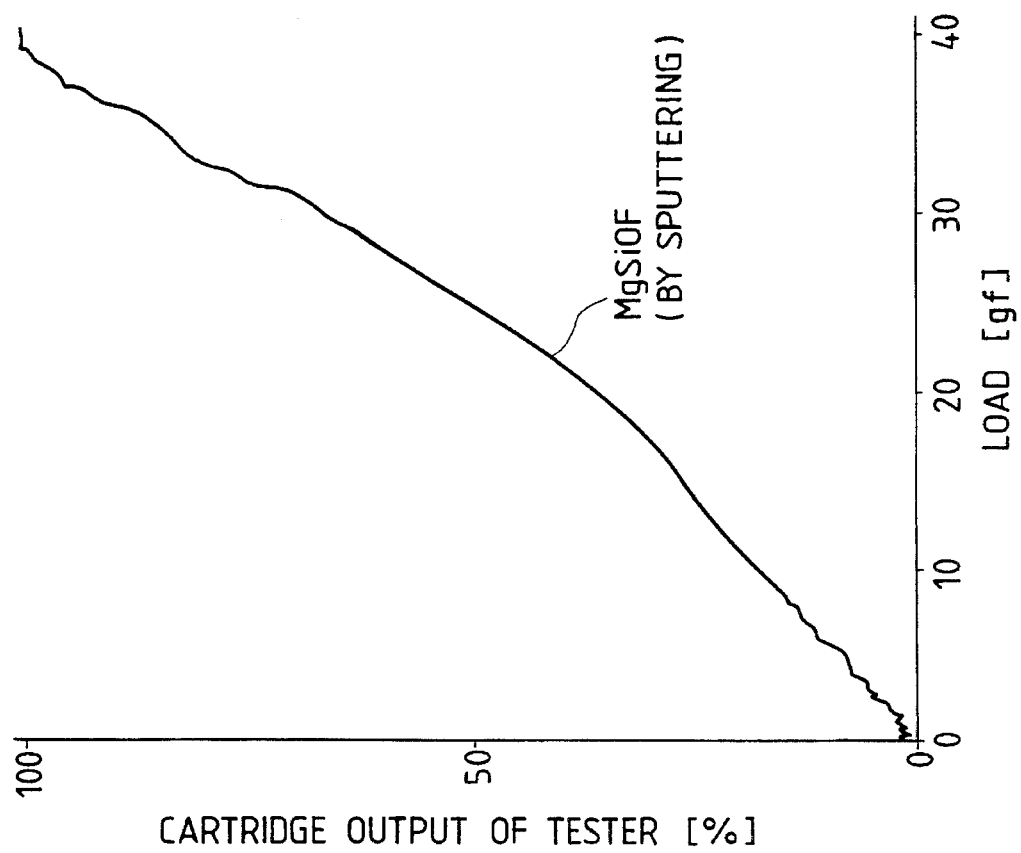
FIG. 6 is a chart showing the result of measurement of adhesion strength of a MgSiOF film.
Figure 5:
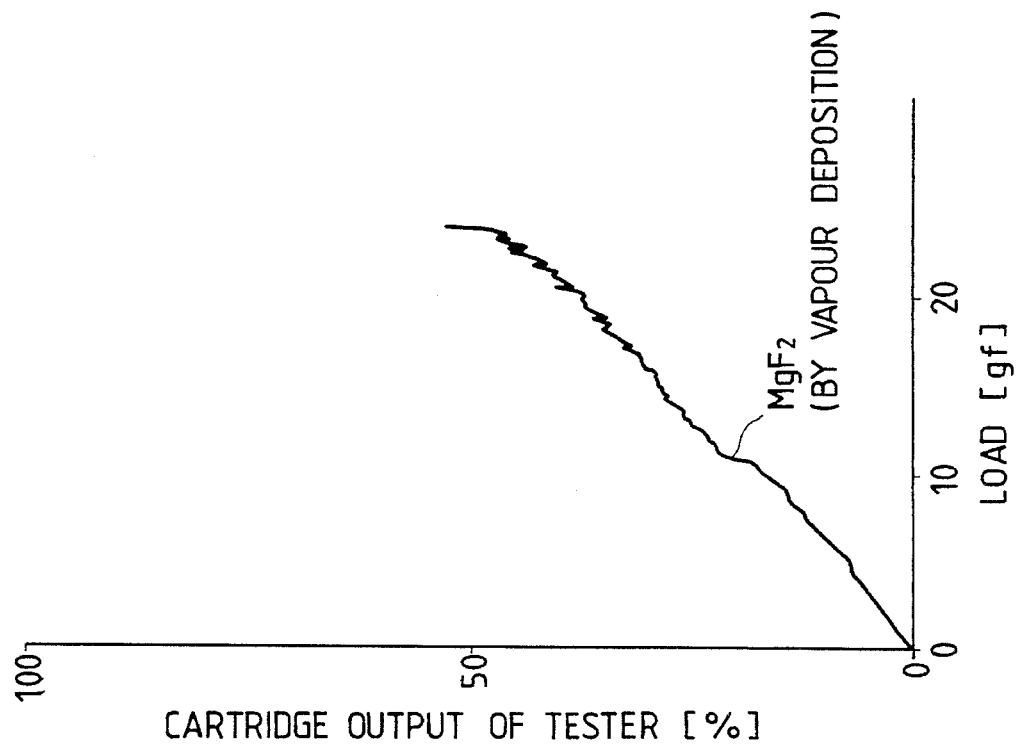
FIG. 5 is a chart showing the result of measurement of adhesion strength of a $MgF_2$ film.

Also the adhesion strengths of the sputtered MgSiOF film (prepared at room temperature) and the evaporated MgF₂ film (prepared at 270° C.) are respectively shown in FIGS. 6 and 5. Both samples were prepared on borosilicate crown glass substrates, and the adhesion strength was measured with the Scratch Tester SST-101 manufactured by Shimadzu Mfg. Co. The measurement was conducted under conditions of a scratching speed of 10 μm/sec., a cartridge amplitude of 100 μm, a maximum load of 50 gf, and a load rate of 2 μm/sec.

As shown in FIG. 6, the MgSiOF film was not peeled up to a load of 40 gf. On the other hand, as shown in FIG. 5, the evaporated MgF₂ film started to break at 10 gf and was completely peeled at 24 gf.

These results indicate that the MgSiOF film is significantly superior, in mechanical strength, to the conventional evaporated MgF₂ film.

Figure 7:
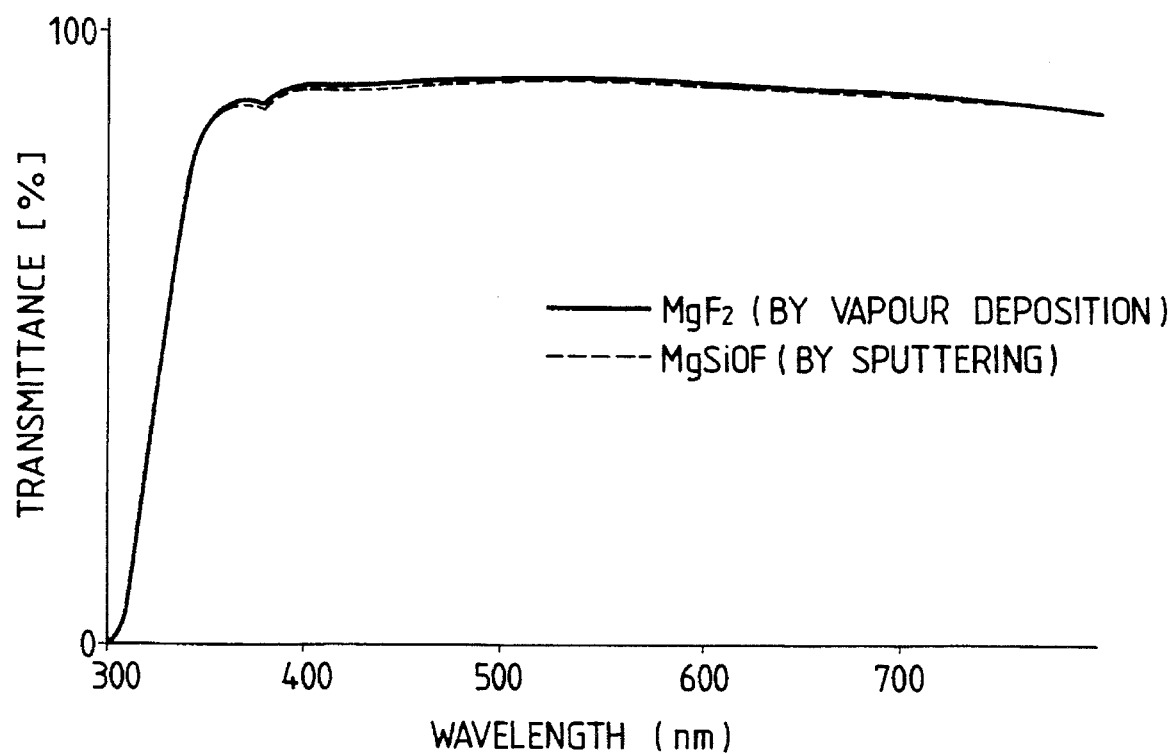
FIG. 7 is a chart showing spectral transmittance of a MgSiOF film and an evaporated $MgF_2$ film.

FIG. 7 shows the spectral transmittance of the sputtered MgSiOF film (prepared at room temperature) and the evaporated MgF₂ film (prepared at 270° C.) deposited on one side of the substrate. The substrate consisted of borosilicate crown glass in both samples. FIG. 7 indicates that the MgSiOF film has optical performance comparable to that of the MgF film conventionally used as the antireflective film, and has a transmittance of about 94% in the visible wavelength region.

In the experimental examples mentioned above, the MgSiOF film was prepared by sputtering, but it can also be prepared by other plasma-based film forming methods such as ion plating. Also in the foregoing examples, a MgF₂ target in which small pieces of Si were mixed, was used, but separate targets of MgF₂ and Si in reactive sputtering may be used.

Embodiment 1

Figure 8:
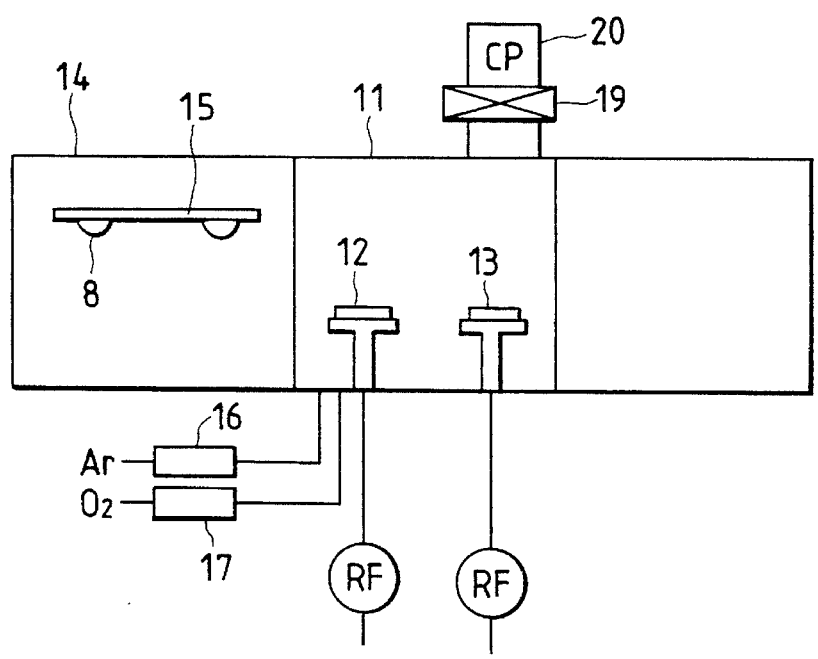
FIG. 8 is a schematic view of a sputtering apparatus employed in an embodiment of the present invention.

FIG. 8 shows an in-line sputtering apparatus ILC-3123 manufactured by Nichiden Anelva Co., Ltd. In a sputtering chamber 11, a mixed target 12 consisting of ZrO₂ and Si (15 wt. %), and a mixed target 13 consisting of MgF₂ and Si (20 wt. %), were placed three-layered film was prepared by sputtering. The substrate comprised a plastic lens (a high refractive urethane resin lens; n=1.60) 18 with an organic hard coating 21.

Figure 9:
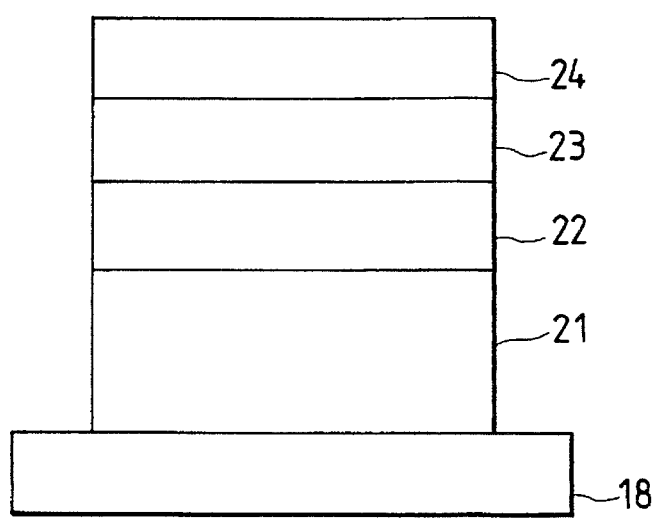
FIG. 9 is a view showing the structure of an antireflective film formed in the first embodiment of the present invention.
Figure 10:
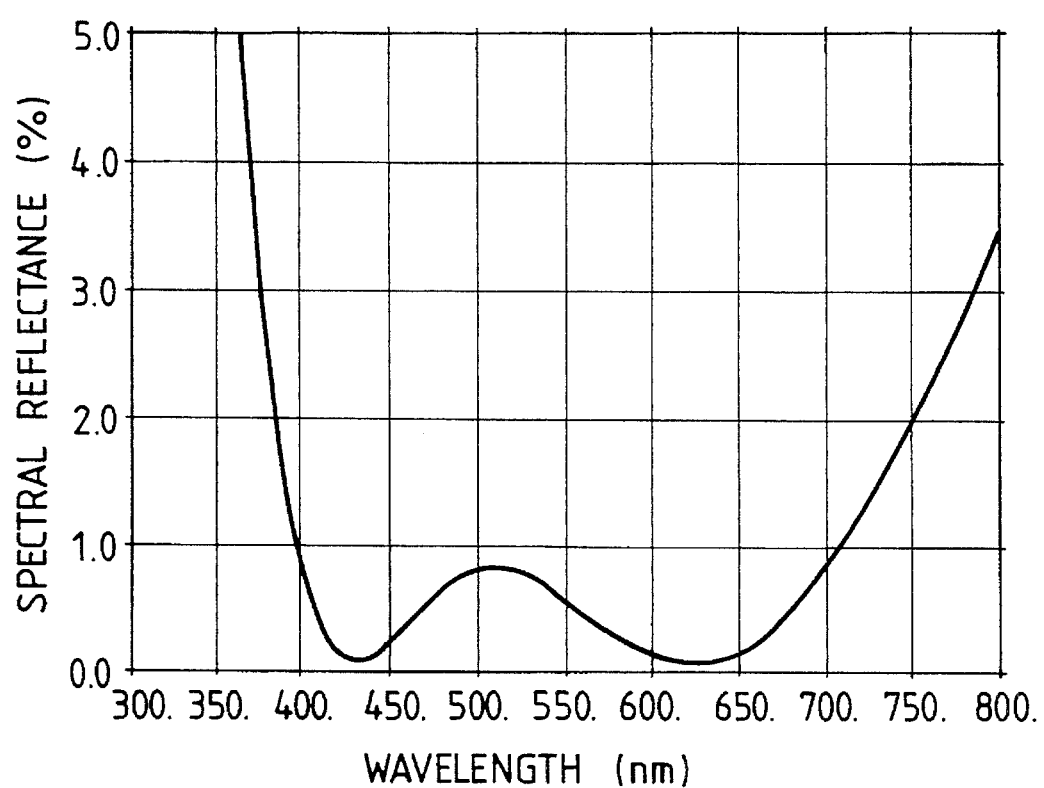
FIG. 10 is a chart showing the spectral reflectance of the antireflective film formed in the first embodiment of the present invention.

The plastic lens 18 was washed in a 7-tank ultrasonic washer, as a surface treatment prior to the sputtering, then set on a substrate holder 15, with the convex surface downward, and was placed in a load lock chamber 14 of the sputtering apparatus. Then said plastic lens 18 was transferred to the sputtering chamber 11, which was subsequently evacuated to a background pressure of $1.1 \times 10^{-3}$ Pa. Then argon and oxygen were introduced, respectively at flow rates of 40 and 20 sccm, respectively, by mass flow controllers 16, 17, to attain a pressure of $6.0 \times 10^{-1}$ Pa in the sputtering chamber 11. Then, an RF power of 700 W was applied to effect sputtering with the mixed target 13, consisting of ZrO₂ and Si (15 wt. %), thereby forming a ZrSiO film 22 of a geometrical thickness of 589 Å (optical thickness nd=λ/4, λ= 450 nm, n=1.91). Subsequently, the oxygen flow rate alone was changed to 2.5 sccm while the sputtering pressure of argon and oxygen was maintained at $6.0 \times 10^{-1}$ Pa and the RF power was also maintained at 700 W as in the foregoing case. In this manner there was formed a second ZrSiO film 23 of a geometrical thickness of 574 Å (nd=λ/4, λ=450 nm, n=1.96). Subsequently, the evacuating speed of the cryopump 20 was reduced, by the variable orifice 19, to regulate the pressure of argon and oxygen at the sputtering to 1.1 Pa. Thus, a MgSiOF film 24, of a geometrical thickness of 792 Å (nd=λ/4, λ=450 nm, n=1.42), constituting a third layer, was formed under the conditions same as those for the second layer. Thus, the antireflective film on the convex face of the plastic lens 18 was completed. Then the plastic lens 18 was transferred to a load lock chamber 14, taken out therefrom, and set on the holder 15 with the concave side downwards, and introduced again into said load lock chamber 14. The steps thereafter are similar to those for film formation on the convex face. In this manner the multi-layered antireflective film is formed on both faces of the plastic lens. The structure and the spectral reflectance of said antireflective film are respectively shown in FIGS. 9 and 10. Table 3 shows the result of mechanical performance, evaluated in the following manner, of thus obtained sputtered antireflective film:

scratch resistance: by rubbing with steel wool of #0000 under a load of 800 g, for 50 reciprocating strokes within 30 seconds;

adhesion strength: by peeling with a cellophane adhesive tape with a force of 4–5 kg/cm$^2$;

heat resistance: 2 minutes standing at 100° C.

TABLE 3

| Scratch resistance | Adhesion resistance | Heat resistance |
| --- | --- | --- |
| slight scars | no film peeling | satisfactory |

Embodiment 2

Figure 11:
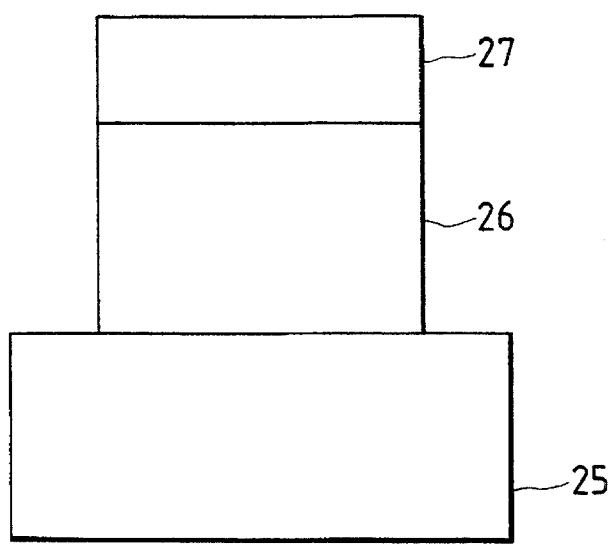
FIG. 11 is a view showing the structure of an antireflective film formed in the second embodiment of the present invention.
Figure 12:
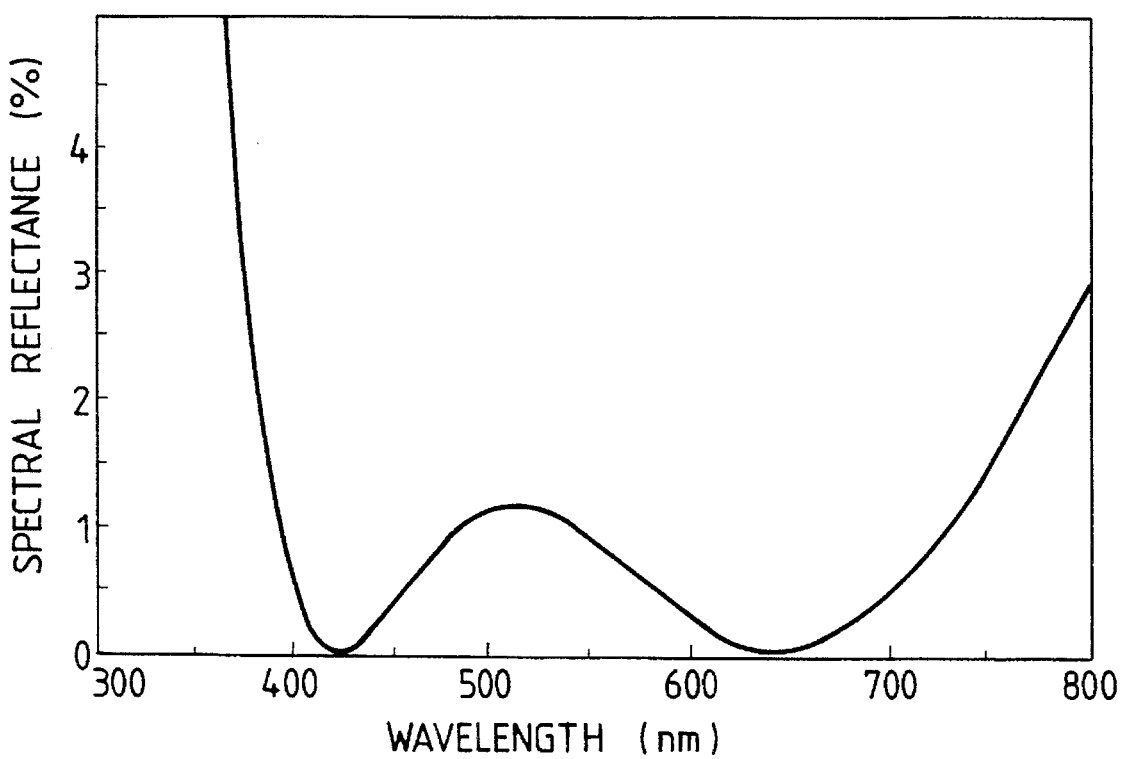
FIG. 12 is a chart showing the spectral reflectance of the antireflective film formed in the second embodiment of the present invention.
Figure 13:
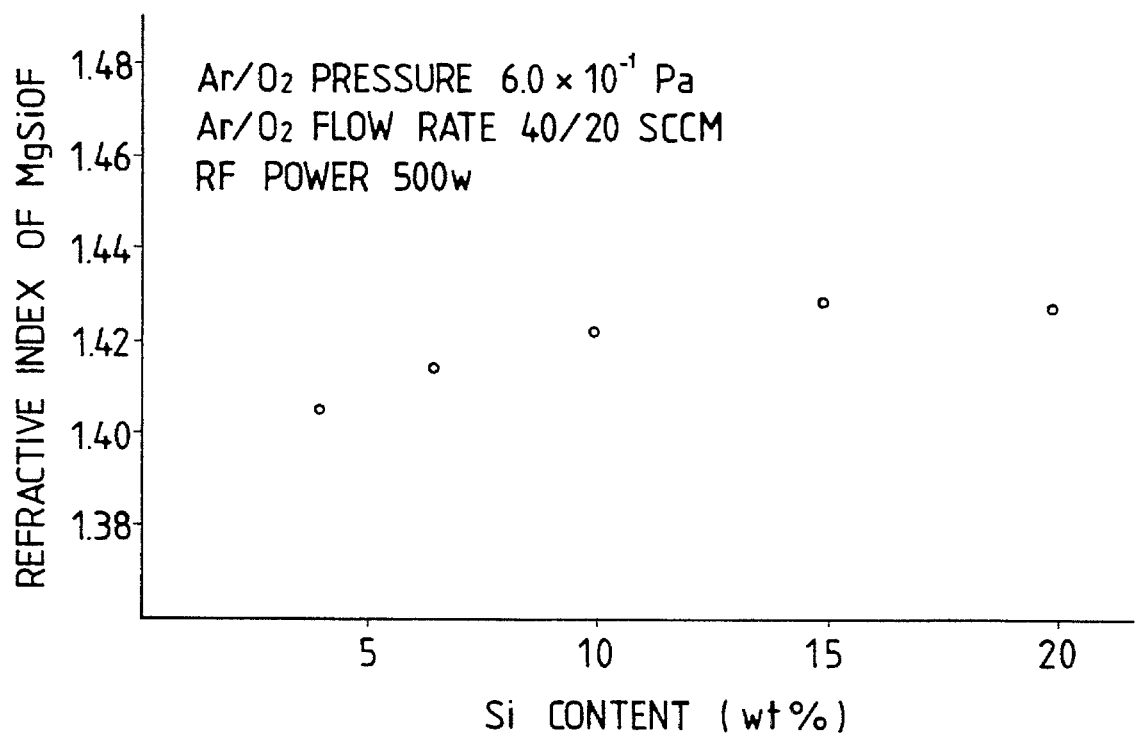
FIG. 13 is a chart showing the relationship between the Si content in the film and the refractive index thereof.
Figure 14:
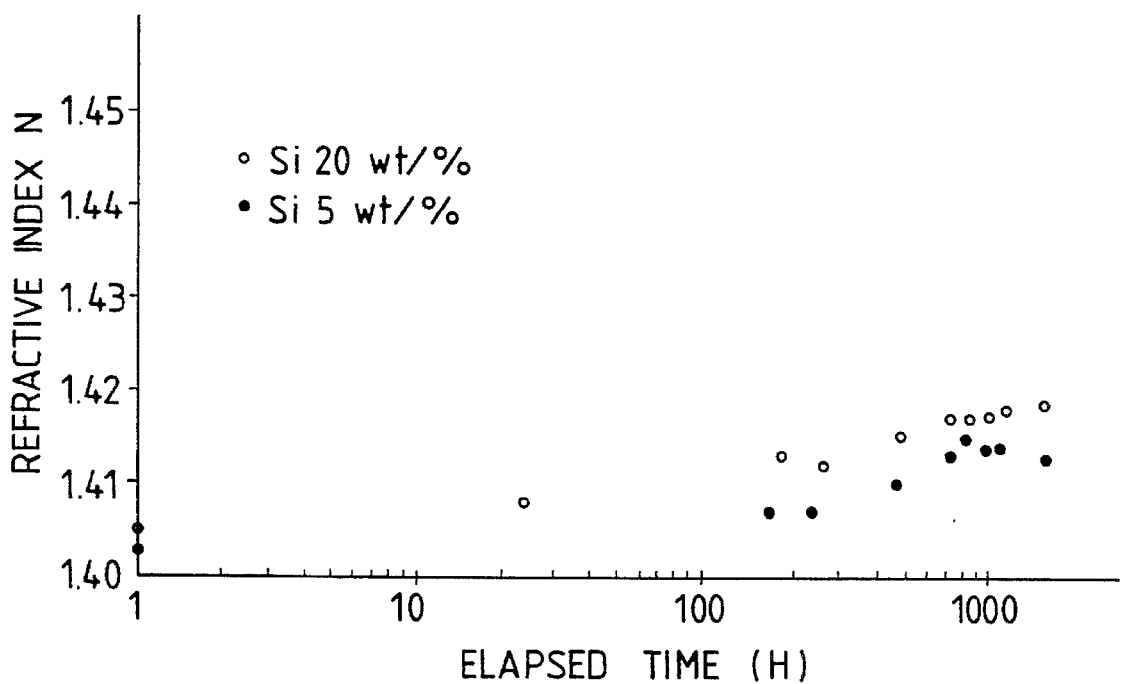
FIG. 14 is a chart showing the time-dependent variation of the refractive index of the film.

FIG. 11 illustrates an example of the optical element bearing the antireflective film of the present invention. After a spectacle glass (flint glass $n_d$=1.60) 25 was subjected to ultrasonic washing, it was set on a jig and placed in the chamber of an RF sputtering apparatus shown in FIG. 8. After the chamber was evacuated to a pressure of $1 \times 10^{-3}$ Pa, argon and oxygen were introduced with respective flow rates of 40 and 20 sccm to a pressure of $6.0 \times 10^{-1}$ Pa. Thereafter, sputtering was conducted with a mixed target of $ZrO_2$ and Si to form a ZrSiO film 26, constituting a first layer, with an optical thickness of 0.50 λ (λ=510 nm, n=1.92). Then argon and oxygen were introduced into the chamber with respective flow rates of 40 and 2.5 sccm to a pressure of 1.1 Pa. Thereafter, sputtering was conducted with a mixed target of $MgF_2$ and Si to form a MgSiOF film 27, constituting a second layer, with an optical thickness of 0.25λ (λ=510 nm, n=1.41). The spectral reflectance of this antireflective film is shown in FIG. 12. As will be apparent from FIG. 12, the antireflective film of the present embodiment shows a low reflectance over a wide spectral range comparable to that of the conventional antireflective film of three or more layers.

As explained in the foregoing, the present invention provides an antireflective film of a wide spectral range which has not been attained by a two-layered structure, by the combination of a MgSiOF film and a ZrSiO film. This enables production of an inexpensive, practical antireflective film with a satisfactory productivity, and of an optical element provided with said antireflective film.

Besides the MgSiOF film constituting the outermost layer at the air side, having a tight crystal structure and a mechanical strength superior to that of the conventional films for the optical element, is excellent in durability and shock resistance. Also as the deposited dusts can be easily removed, a water-repellent organic coating which is usually employed in the plastic spectacle lenses is not needed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An antireflective film comprising:

a film composed of an inorganic chemical compound comprising Mg, Si, O and F; and a film composed of an inorganic chemical compound comprising Zr, Si and O.

2. An antireflective film according to claim 1, wherein the film composed of an inorganic chemical compound comprising Mg, Si, O and F has the atomic ratios of the constituent elements in the following ranges:

$1.3 \leq F/Mg \leq 3.2$;

$0.4 \leq O/Mg \leq 1.4$;

$0.1 \leq Si/Mg \leq 0.6$.

3. An antireflective film according to claim 1, wherein the film composed of an inorganic chemical compound comprising Ar, Si and O has the atomic ratios of the constituent elements in the following ranges:

$0.5 \leq Si/Zr \leq 15$;

$1.6 \leq O/Zr \leq 31.6$.

4. An antireflecting film according to claim 1, wherein percentage by weight of Si contained in said film composed of inorganic chemical compound comprising Mg, Si, O and F is within the range of 5 to 20%.

5. An antireflective film according to claim 1, wherein percentage by weight of Si contained in said film composed of inorganic chemical compound comprising Mg, Si, O and F is within the range of 10 to 20%.

6. An antireflective film according to claim 1, wherein percentage by weight of Si contained in said film composed of inorganic chemical compound comprising Mg, Si, O and F is within the range of 15 to 20%.

7. An antireflective film according to claim 1, wherein said film composed of inorganic chemical compound comprising Mg, Si, O and F includes at least one of a Si-$F_2$ bond and a Si-F bond.

8. An antireflective film according to claim 1, wherein said film composed of inorganic chemical compound comprising Mg, Si, O and F has peaks in an infrared absorption spectrum near the wave numbers of 920 cm$^{-1}$ 832 cm$^{-1}$ and 850 cm$^{-1}$.

9. An optical element comprising:

a transparent body;

a film formed thereon, composed of an inorganic chemical compound comprising Zr, Si and O; and a film formed as an outermost layer facing the air, composed of an inorganic chemical compound comprising Mg, Si, O and F.

10. An optical element according to claim 9, wherein the film composed of an inorganic chemical compound comprising Mg, Si, O and F has the atomic ratios of the constituent elements in the following ranges:

$1.3 \leq F/Mg \leq 3.2$;

$0.4 \leq O/Mg \leq 1.4$;

$0.1 \leq Si/Mg \leq 0.6$.

11. An optical element according to claim 9, wherein the film composed of an inorganic chemical compound comprising Zr, Si and O has the atomic ratios of the constituent elements in the following ranges:

$0.5 \leq Si/Zr \leq 15$;

$1.6 \leq O/Zr \leq 31.6$.

12. An antireflective film according to claim 9, wherein said transparent body is a high refractive urethane resin lens.

13. An antireflective film comprising:

a first film composed of an inorganic chemical compound comprising Mg, Si, O and F; and a second film composed of an inorganic chemical compound comprising Zr, Si and O wherein said first and second films are formed by sputtering performed in plasma.

14. An antireflective film comprising:

a first film composed of an inorganic chemical compound comprising Mg, Si, O and F; and a second film composed of an inorganic chemical compound comprising Zr, Si and O wherein said first and second films are formed by sputtering performed in a plasma, utilizing Ar gas and gas flow is controlled to be 16:1.

\* \* \* \* \*

UNITED STATES PATENT AND TRADEMARK OFFICE
CERTIFICATE OF CORRECTION

PATENT NO. : 5,513,038
DATED : April 30, 1996
INVENTOR(S) : Jun ABE

It is certified that error appears in the above-indentified patent and that said Letters Patent is hereby corrected as shown below:

Column 12, line 17 "Ar gas and gas", should be --Ar gas and $O_2$ gas--.

Signed and Sealed this

Sixteenth Day of July, 1996

Attest:

BRUCE LEHMAN

*Attesting Officer*     *Commissioner of Patents and Trademarks*